(12) United States Patent
Schneider

(10) Patent No.: US 8,081,321 B2
(45) Date of Patent: Dec. 20, 2011

(54) SCANNING UNIT OF AN OPTICAL POSITION MEASURING ARRANGEMENT AND POSITION MEASURING ARRANGEMENT HAVING THIS SCANNING UNIT

(75) Inventor: Giselher Schneider, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 348 days.

(21) Appl. No.: 12/291,256

(22) Filed: Nov. 6, 2008

(65) Prior Publication Data
US 2009/0122323 A1    May 14, 2009

(30) Foreign Application Priority Data
Nov. 8, 2007    (DE) .................. 10 2007 053 137

(51) Int. Cl.
*G01B 11/14* (2006.01)
*G01D 5/36* (2006.01)
(52) U.S. Cl. ............... 356/616; 250/231.14; 250/237 G
(58) Field of Classification Search .................. None
See application file for complete search history.

(56) References Cited

U.S. PATENT DOCUMENTS

| | | | | |
|---|---|---|---|---|
| 5,283,434 A * | 2/1994 | Ishizuka et al. | ........... | 250/237 G |
| 5,534,693 A * | 7/1996 | Kondo et al. | ............. | 250/237 G |
| 5,670,781 A * | 9/1997 | Setbacken | ................ | 250/231.16 |
| 5,742,391 A * | 4/1998 | Kaneda et al. | ................ | 356/499 |
| 6,154,278 A * | 11/2000 | Ito et al. | ........................ | 356/499 |
| 6,476,380 B1 * | 11/2002 | Burgschat | ................ | 250/231.14 |
| 6,486,467 B1 * | 11/2002 | Speckbacher et al. | .... | 250/237 G |
| 6,603,114 B1 * | 8/2003 | Holzapfel et al. | ........ | 250/231.14 |
| 6,621,069 B2 * | 9/2003 | Holzapfel et al. | ........ | 250/231.14 |
| 7,552,625 B2 * | 6/2009 | Degertekin | ..................... | 73/105 |

FOREIGN PATENT DOCUMENTS

DE    44 02 554 A1    10/1994

OTHER PUBLICATIONS

Burgschat, Reiner, "Die neue Dimension in der Weg-und Winkelmeβtechnik," F&M, vol. 104, No. 10, 1996, pp. 752-756.

* cited by examiner

*Primary Examiner* — Michael A Lyons
*Assistant Examiner* — Juan D Valentin
(74) *Attorney, Agent, or Firm* — Brinks Hofer Gilson & Lione

(57) ABSTRACT

A scanning unit, by which a scale, which is movable in relation to the scanning unit in a measuring direction, can be optically scanned. The scanning unit including a detector arrangement and a transparent support having a first surface and a second surface, wherein the detector arrangement is arranged on the second surface. The scanning unit further including a transparent cover plate, which is fastened on the first surface of the transparent support and includes a shielding device for shielding the detector arrangement against electromagnetic fields.

11 Claims, 1 Drawing Sheet

SCANNING UNIT OF AN OPTICAL POSITION MEASURING ARRANGEMENT AND POSITION MEASURING ARRANGEMENT HAVING THIS SCANNING UNIT

RELATED APPLICATIONS

Applicant claims, under 35 U.S.C. §119, the benefit of priority of the filing date of Nov. 8, 2007 of a German patent application, copy attached, Ser. No. 10 2007 053 137.2, filed on the aforementioned date, the entire contents of which is incorporated herein by reference.

BACKGROUND

1. Technical Field

The present invention relates to a scanning unit of an optical position measuring arrangement, by which a scale, which can be moved in relation to it in the scanning direction, can be optically scanned, as well as to a position measuring arrangement having this scanning unit.

2. Background Information

Such scanning units and position measuring arrangements are designed in the form of linear measuring devices having a linear scale, or as rotary measuring devices, having a disk-shaped or drum-shaped scale. They are in particular employed in processing machinery for measuring the relative movement of a tool with respect to a workpiece to be worked, in connection with robots, coordinate measuring machinery, and increasingly in the semiconductor industry.

In many applications, the position measuring arrangement is exposed to electrical fields, in particular to interfering electrical alternating fields, which have an effect on electrically conducting elements of the scanning device and cause electrical interferences and a resultant erroneous position detection.

It is proposed in DE 44 02 554 A1 to shield the detector arrangement against electromagnetic interference fields by a transparent, electrically conducting shielding body, which is connected to ground potential.

In actual use it has been shown that in connection with this construction the production of the shielding device and the electrical contact with ground potential is difficult.

OBJECTS AND SUMMARY OF THE INVENTION

It is therefore an object of the present invention to create a compact and dependably shielded scanning unit, or respectively position measuring arrangement.

This object is attained by a scanning unit, by which a scale, which is movable in relation to the scanning unit in a measuring direction, can be optically scanned. The scanning unit including a detector arrangement and a transparent support having a first surface and a second surface, wherein the detector arrangement is arranged on the second surface. The scanning unit further including a transparent cover plate, which is fastened on the first surface of the transparent support and includes a shielding device for shielding the detector arrangement against electromagnetic fields.

This object is also attained by an optical position measuring arrangement including a scale and a scanning unit, which is movable in a measuring direction relative to the scale. The scanning unit includes a detector arrangement and a transparent support having a first surface and a second surface, wherein the detector arrangement is arranged on the second surface and wherein the first surface of the transparent support faces the scale and the second surface of the transparent support faces away from the scale. The scanning unit further includes a transparent cover plate, which is fastened on the first surface of the transparent support and includes a shielding device for shielding the detector arrangement against electromagnetic fields.

The advantage of the present invention lies in that it is possible to realize a compact and dependably shielded scanning unit, or respectively position measuring arrangement.

It is intended by exemplary embodiments represented in the drawings to explain the concept on which the present invention is based and further characteristics and variants of the present invention.

BRIEF DESCRIPTION OF THE DRAWINGS

Shown are in.

DETAILED DESCRIPTION OF THE PREFERRED EMBODIMENTS

Figure 1:
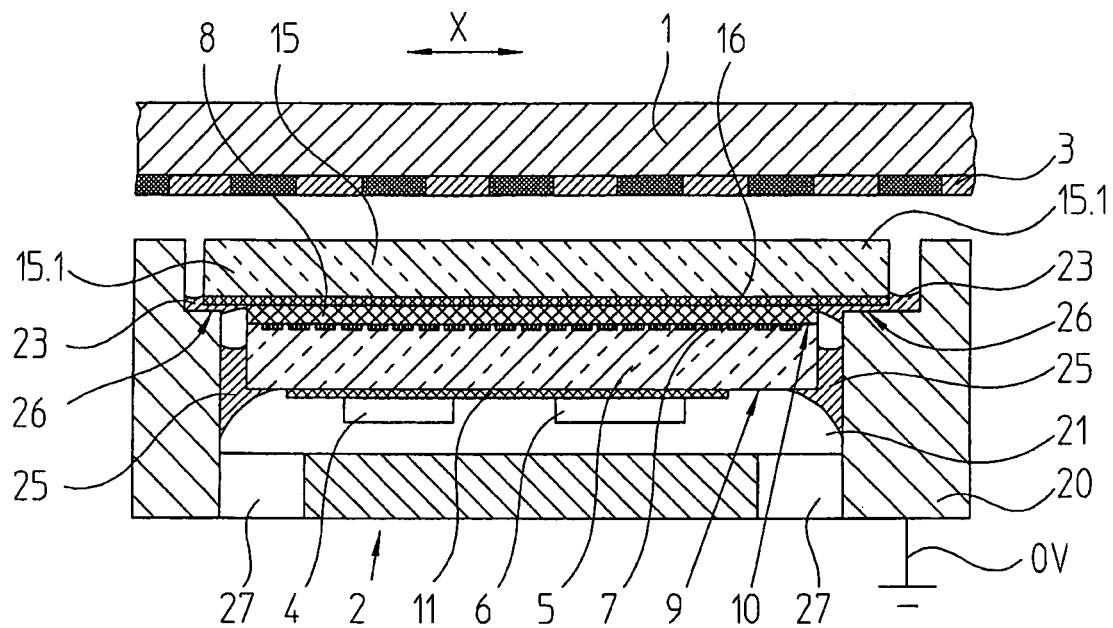
FIG. 1 shows a longitudinal section through an embodiment of an optical position measuring arrangement in accordance with the present invention.
Figure 2:
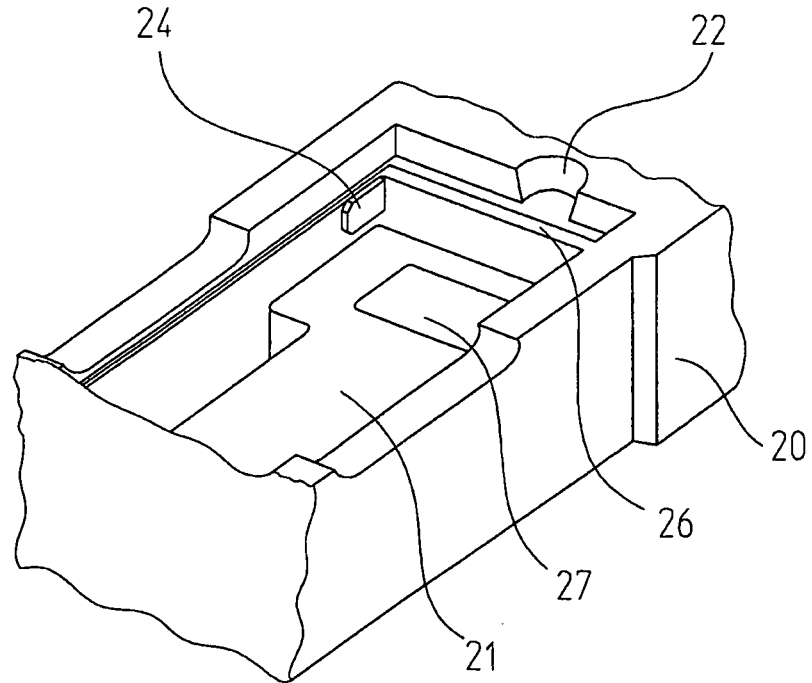
FIG. 2 shows a perspective representation of a portion of an embodiment of a base body of an embodiment of a scanning unit used with the position measuring arrangement of FIG. 1 in accordance with the present invention.

FIGS. 1 and 2 show an exemplary embodiment of an optical position measuring arrangement. In this case, the position measuring arrangement is a linear measuring arrangement, having a linear scale 1 and a scanning unit 2, which can be moved relative to the scale 1 in the measuring direction X. The scale 1 has a measuring graduation 3, which can be scanned by incident light, i.e. is reflecting, and which is scanned by the scanning unit 2. Here, the scanning unit 2 includes a light source 4, whose light impinges on the scale 1, is modulated there by the measuring graduation 3 as a function of its position and is reflected onto a detector arrangement 6.

The detector arrangement 6 is arranged on a transparent support 5, namely on the surface 9 facing away from the scale 1. The transparent support 5 is made of an electrically insulating transparent material, in particular, it is a plan-parallel glass plate with two surfaces 9, 10 extending parallel with and located opposite each other. One of these surfaces 10 is facing the scale 1, in what follows, this surface 10 will be called first surface 10. But the second surface 9 is facing away from the scale 1. The detector arrangement 6 is arranged on this second surface 9. Mechanical and electrical contact with the detector arrangement takes place in a known manner by chip-on-glass technology, in that a strip conductor pattern 11 is formed by coating the second surface 9, by which contact surfaces (bond pads) of the detector arrangement 6 are contacted via so-called bumps in accordance with flip-chip technology and face down. Spaces between the detector arrangement 6 and the transparent support 5 are optionally filled with an under-filter, which contributes to the mechanical stabilization of the construction.

The transparent support 5 has a scanning grating 7, which includes in a known manner of opaque areas and transparent areas arranged alternatingly next to each other. The scanning grating 7 is used for forming several partial bundles of beams, which interact with the measuring graduation 3 of the scale 1 and impact on the detector arrangement 6 for generating position-dependent scanning signals, which are phase-shifted with respect to each other. In the represented example, the scanning grating 7 is arranged on the first surface 10 of the transparent support 5. This spatial arrangement has advantages in the production, since the scanning grating 7 can be produced as a separate coating independently of the strip conductor pattern 11 embodied as a further coating. In a manner not represented, the scanning grating can also be a part of the detector arrangement 6 by being applied in a manner known per se to the light-sensitive surfaces, or the light-sensitive areas of the detector arrangement 6 are themselves structured as scanning gratings.

The transparent support 5 with the light source 4 and the detector arrangement 6 is only schematically represented, a possible actual embodiment has been described in the magazine article F&M, 1996, 10, pages 752 to 756, for example.

The transparent support 5 with the detector arrangement 6 fastened thereon is arranged in a recess 21 of a base body 20. This recess 21 of the base body 20 is covered by a transparent cover plate 15. The base body 20 is electrically conducting by including itself of an electrically conducting material or being coated with electrically conducting material, and it shields the detector arrangement 6 against electromagnetic fields on five sides. The base body 20, or respectively its electrically conducting coating, can be connected in a particularly easy manner with a reference potential OV which, in the course of installing the scanning unit 2 on a machine element whose position is to be measured, takes place by a simple contact with this machine element. The cover plate 15 is provided with a shielding device 16 for shielding the still open side, i.e. the access opening for inserting the transparent support 5 into the recess 21. This shielding device 16 is arranged on the surface facing the first surface 10 of the transparent support 5. In an advantageous manner, the cover plate 15 is also a planparallel glass plate.

If the scanning unit is inserted into an encapsulated position measuring arrangement, the base body 20 is the scanning carriage, which is longitudinally guided on the scale 1 in the measuring direction X via guide elements (sliding bearings, rollers, ball bearings).

The shielding device 16 is a coating of the scanning plate 15 and includes a transparent, electrically conducting material, in particular of indium tin oxide, also called ITO. This coating has been applied of a large surface and shields the entire opening of the recess 21. It is also alternatively possible for the shielding to be an electrically conducting grating structure, which is embodied in such a way that, in connection with the measuring graduation 3, it does not cause any position-dependent modulation and is transparent, at least partially, to the scanning beam path.

The cover plate 16 is fastened to the first surface 10 of the transparent support 5, in particular via a flat, thin, transparent layer, for example in the form of a continuous or parallel, partially applied transparent adhesive layer 8, or in the form of a thin oil film acting as an adhesive film. The cover plate 15 projects, at least partially, laterally over the transparent support 5, and the shielding device 16 is extended as far as this projecting area 15.1, so that it can be used there for a simple and space-saving electrical contact with the base body 20, as well as with the reference potential OV. This contact, which is designed to be electrical and to have low impedance, takes place in a particularly simple manner in that a gap is created between the support 26 and the projecting areas 15.1 of the cover plate 15, into which an electrically conducting adhesive 23 is introduced over a relatively large surface. By the interposition of the adhesive 23, the lateral surfaces of the recess 21 thus constitute a support 26 for the cover plate 15 (detail represented in FIG. 2). At least one pocket 22, visible in FIG. 2, is provided on the base body 20 for the satisfactory introduction of the electrically conducting adhesive 23 between the cover plate 16 and the base body 20. The pocket 22 is used as a reserve for the adhesive 23, so that the latter can flow by means of capillary action into the gap between the cover plate 15 and the support 26 of the base body 20.

The package including the transparent support 5 and the cover plate 15 has been positioned aligned in the recess 21 of the base body 20. To this end, sides of the transparent support 5 cooperate with stops 24 of the base body 20. It is advantageous if only the transparent support 5 is aligned on the base body 20 by means of several lateral stops 24, and the cover plate 15 is here arranged over the entire circumference at a distance from the inner circumferential surfaces of the recess 21 of the base body 20, which are located opposite the sides of the cover plate 15. Redundancy in the positioning of the support 5 on the base body 20 is prevented in this way.

For further securing the seating of the support 5 on the base body 20, it is fixed in place along its edges on the base body 20 by an adhesive 25. The adhesive 25 is introduced through passages 27 in the base body 20.

Still further electrical components for evaluating the electrical scanning signals provided by the detector arrangement 6 are located on the support 5 in addition to the detector arrangement 6. It is particularly advantageous if these components and the detector arrangement 6 are together embodied in an opto-chip (ASIC). In that case the term detector arrangement corresponds to the ASIC component.

A scale can also be scanned by transmitted light with the scanning unit in accordance with the invention. In this case the light source is not located on the transparent support, but on the other side of the scale.

The spatial arrangement of the cover plate 15 in the scanning gap between the scale 1 and the support 5 has the further advantage that the scanning gap is filled with a defined material and can be less affected in an undefined manner by media, such as dust and fluids. Therefore the thickness of the cover plate 15 is selected to be such that the distance between the scale 1 and the support 5 is almost completely filled by the cover plate 15, but that the free relative movement between the scale 1 and the scanning unit 5 in the measuring direction X for position measurement is not hampered.

The foregoing description is provided to illustrate the present invention, and is not to be construed as a limitation. Numerous additions, substitutions and other changes can be made to the present invention without departing from its scope as set forth in the appended claims.

I claim:

1. A scanning unit, by which a scale, which is movable in relation to said scanning unit in a measuring direction, can be optically scanned, said scanning unit comprising:
   a detector arrangement;
   a transparent support comprising a first surface and a second surface wherein said detector arrangement is arranged on said second surface;
   a transparent cover plate, which is fastened on said first surface of said transparent support and comprises a shielding device for shielding said detector arrangement against electromagnetic fields;
   wherein said transparent support with said detector arrangement is arranged in a recess of a base body, and said recess is covered by said transparent cover plate, and wherein said base body is electrically conducting, and said shielding device is connected in an electrically conducting manner with said base body;
   wherein said transparent cover plate comprises areas which laterally project past said transparent support, and wherein said shielding device is arranged on a surface of said transparent cover plate which faces said first surface of said transparent support; and wherein said shielding device is in electrical contact with said base body at said areas of said transparent cover plate.

2. The scanning unit in accordance with claim 1, wherein said shielding device comprises a transparent layer of an electrically conducting material.

3. The scanning unit in accordance with claim 2, wherein said electrically conducting material comprises indium tin oxide.

4. The scanning unit in accordance with claim 1, wherein said transparent support comprises a scanning grating.

5. The scanning unit in accordance with claim 4, wherein said scanning grating is formed on said first surface of said transparent support.

6. The scanning unit in accordance with claim 1, wherein said second surface of said transparent support comprises a coating forming a strip conductor pattern, with which said detector arrangement is brought into contact by flip-chip technology.

7. The scanning unit in accordance with claim 1, wherein said shielding device of said cover plate is in electrical contact with said base body by an electrically conducting adhesive.

8. A scanning unit, by which a scale, which is movable in relation to said scanning unit in a measuring direction, can be optically scanned, said scanning unit comprising:
   a detector arrangement;
   a transparent support comprising a first surface and a second surface, wherein said detector arrangement is arranged on said second surface;
   a transparent cover plate, which is fastened on said first surface of said transparent support and comprises a shielding device for shielding said detector arrangement against electromagnetic fields;
   wherein said transparent support with said detector arrangement is arranged in a recess of a base body, and said recess is covered by said transparent cover plate, and;
   wherein a package comprising said transparent support and said transparent cover plate is positioned in said recess of said base body in that sides of said transparent support cooperate with stops of said base body.

9. The scanning unit in accordance with claim 8, wherein when said package is positioned in said recess, said transparent cover plate is arranged at a distance from inner circumferential faces of said recess of said base body which are located opposite sides of said transparent cover plate.

10. An optical position measuring arrangement, comprising;
    a scale; and
    a scanning unit, which is movable in a measuring direction relative to said scale, wherein said scanning unit comprises:
    a detector arrangement;
    a transparent support comprising a first surface and a second surface, wherein said detector arrangement is arranged on said second surface and wherein said first surface of said transparent support faces said scale and said second surface of said transparent support faces away from said scale; and
    a transparent cover plate, which is fastened on said first surface of said transparent support and comprises a shielding device for shielding said detector arrangement against electromagnetic fields;
    wherein said transparent support with said detector arrangement is arranged in a recess of a base body, and said recess is covered by said transparent cover plate, and wherein said base body is electrically conducting, and said shielding device is connected in an electrically conducting manner with said base body; and
    wherein said transparent cover plate comprises areas which laterally project past said transparent support, and wherein said shielding device is arranged on a surface of said transparent cover plate which faces said first surface of said transparent support; and
    wherein said shielding device is in electrical contact with said base body at said areas of said transparent cover plate.

11. An optical position measuring arrangement, comprising;
    a scale; and
    a scanning unit, which is movable in a measuring direction relative to said scale, wherein said scanning unit comprises:
    a detector arrangement;
    a transparent support comprising a first surface and a second surface, wherein said detector arrangement is arranged on said second surface and wherein said first surface of said transparent support faces said scale and said second surface of said transparent support faces away from said scale; and
    a transparent cover plate, which is fastened on said first surface of said transparent support and comprises a shielding device for shielding said detector arrangement against electromagnetic fields;
    wherein said transparent support with said detector arrangement is arranged in a recess of a base body, and said recess is covered by said transparent cover plate, and wherein a package comprising said transparent support and said transparent cover plate is positioned in said recess of said base body in that sides of said transparent support cooperate with stops of said base body.

* * * * *